June 3, 1969 T. W. GROSSE-RHODE 3,447,834
DUMP LOAD BED FOR VEHICLES
Filed April 10, 1967 Sheet 1 of 2
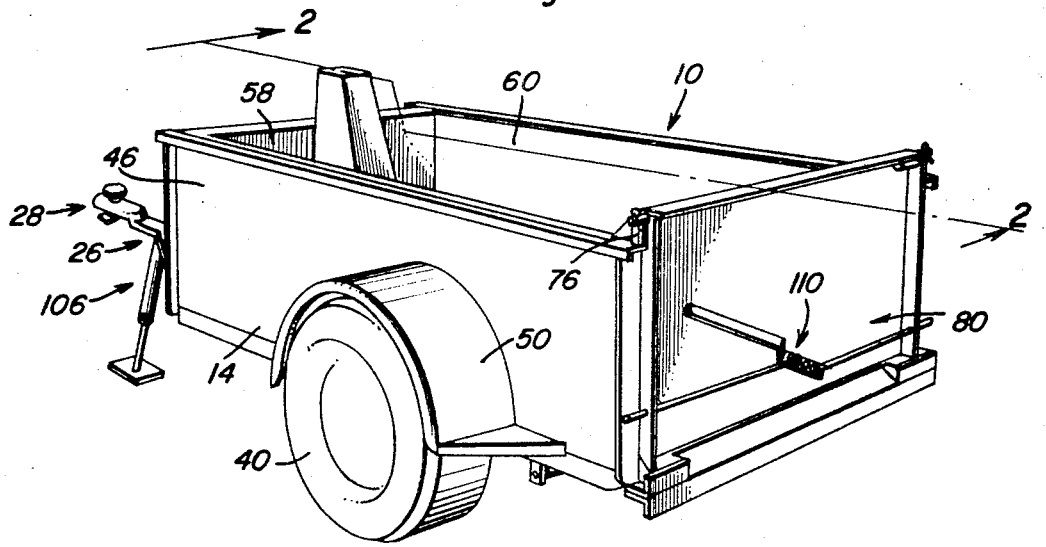
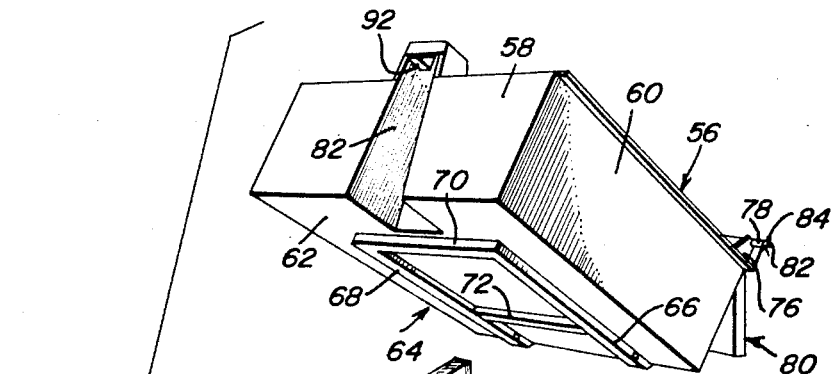
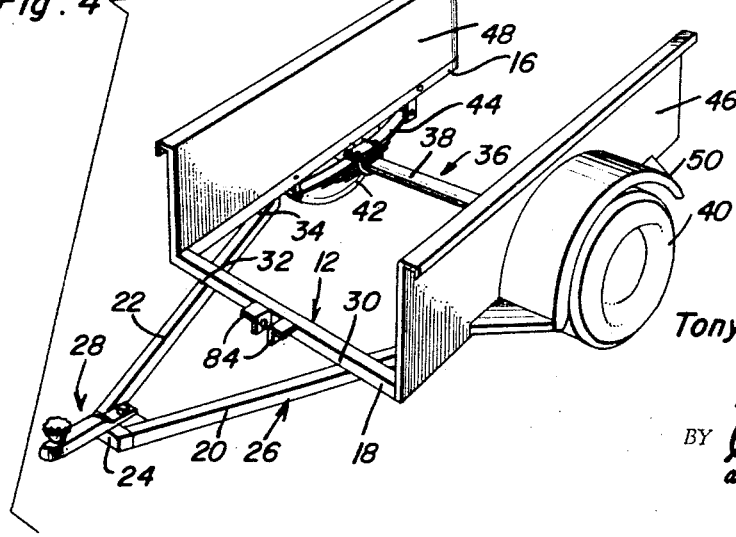
Tony W. Grosse-Rhode
INVENTOR.

June 3, 1969

T. W. GROSSE-RHODE 3,447,834

DUMP LOAD BED FOR VEHICLES

Filed April 10, 1967

Tony W. Grosse-Rhode
INVENTOR.

BY *Clarence A. O'Brien*
*and Harvey B. Jackson*
Attorneys

United States Patent Office 3,447,834
Patented June 3, 1969

3,447,834
DUMP LOAD BED FOR VEHICLES
Tony W. Grosse-Rhode, 8233 Keystone Drive,
Omaha, Nebr. 68134
Filed Apr. 10, 1967, Ser. No. 629,672
Int. Cl. B60p 1/16; B62d 33/08, 53/04
U.S. Cl. 298—22
3 Claims

ABSTRACT OF THE DISCLOSURE

A trailer construction including a wheeled frame having front and rear end portions and a pair of upstanding longitudinally extending opposite side wall means supported from the rear end portion of the frame with a dump-type load bed supported from the frame between the side wall means and including upstanding front and opposite side walls interconnected adjacent their lower ends by means of a bottom wall, the rear end portion of the load bed being pivotally supported from the frame for swinging movement relative thereto about a horizontal axis extending transversely of the frame between a horizontal load carrying position and a forwardly and upwardly inclined dumping position and means being operatively connected between the forward end portion of the load bed and the frame operable to swing the load bed from the load carrying position toward the dumping position thereof.

---

The dumping trailer of the instant invention may of course be constructed as large or small as desired and of any suitable materials. Further, the running gear of the trailer may be of any desired type for supporting the load to be carried by the trailer and the forwardly projecting tongue portion of the trailer may be provided with any suitable means for attachment to a towing vehicle.

The main object of this invention is to provide a trailer which will be capable of not only serving the usual purpose of a trailer, to provide a means whereby an appreciable load may be towed behind a towing vehicle, but to also provide a trailer which will be capable of dumping a load carried thereby.

Although the trailer of the instant invention is not illustrated and described hereinafter as including any attachments for spreading or accurately metering a load being dumped therefrom, it is to be understood that any such attachments may be provided if desired.

Another object of this invention is to provide a trailer in accordance with the preceding object including its own power source for causing the load bed portion of the trailer to pivot from the load carrying position to the dumping position.

Another object of this invention is to provide a trailer in accordance with the immediately preceding object and constructed in a manner whereby the load bed portion of the trailer may be shifted from the load carrying position thereof to the dumping position thereof even when the trailer is not connected to a towing vehicle.

A final object of this invention to be specifically enumerated herein is to provide a dumping trailer which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the trailer of the instant invention;

FIGURE 4 is an exploded perspective view of the trailer.

Figure 2:
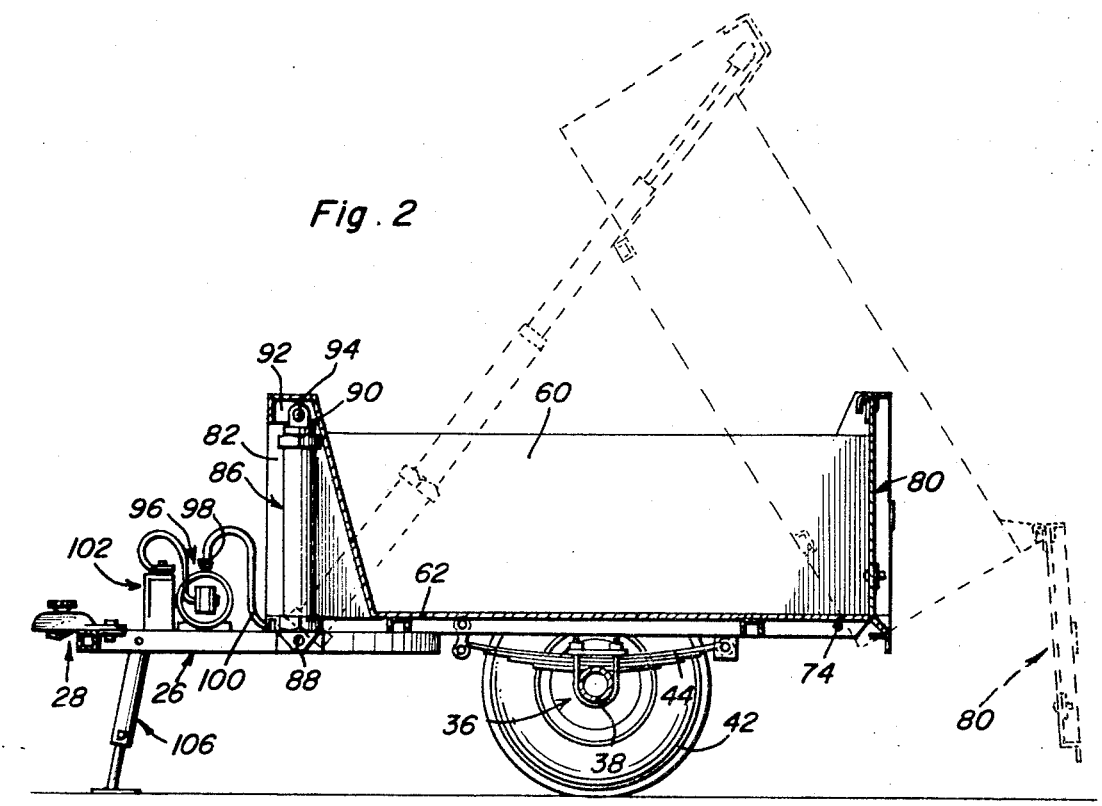
FIGURE 2 is an enlarged longitudinal vertical sectional view taken substantially upon the plane indicated by the section line 2—2 of FIGURE 1 and with an alternate position of the load bed carrying portion of the trailer illustrated in phantom lines.
Figure 3:
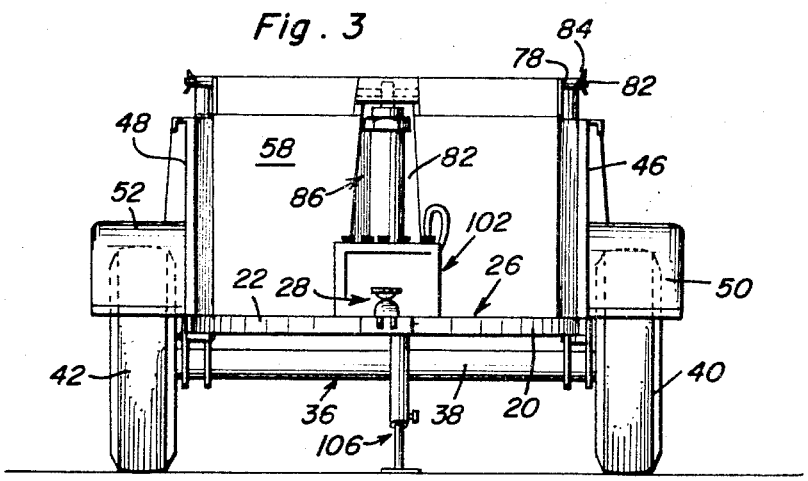
FIGURE 3 is a front elevational view of the trailer as seen from the left side of FIGURE 2.

Referring now more specifically to the drawings the numeral 10 generally designates the trailer of the instant invention. The trailer 10 includes a main frame referred to in general by the reference numeral 12 consisting of a pair of opposite side longitudinal frame members 14 and 16 interconnected at their forward ends by means of a forward transverse member 18. In addition, the frame 12 includes a pair of opposite side forwardly convergent members 20 and 22 interconnected at their forward ends by means of a transverse member 24 and defining a tongue portion referred to in general by the reference numeral 26. Any suitable hitch construction 28 is carried by the forward end of the tongue portion 26 and the rear end portions of the members 20 and 22 are fixedly secured to opposite side portions of the transverse member 18 in any convenient manner as at 30 and 32 and to the longitudinal members 14 and 16 at their rear ends as at 34.

The frame 12 further includes a running gear assembly generally referred to by the reference numeral 36 and including a transverse axle assembly 38 provided with opposite side ground engaging wheels 40 and 42 and supported from the longitudinal members 14 and 16 by means of suitable opposite side leaf spring assemblies 44. Further, the frame 12 also includes a pair of upstanding and longitudinally extending side walls 46 and 48 from which outwardly projecting fenders 50 and 52, respectively, are supported. Of course, the fenders 50 and 52 overlie the wheels 40 and 42.

The trailer 10 further includes a load bed assembly generally referred to by the reference numeral 56 and including upstanding front and side walls 58 and 60 interconnected by means of a bottom wall 62 including a reinforcing frame referred to in general by the reference numeral 64. The reinforcing frame 64 includes a pair of opposite side longitudinal members 66 and 68 secured to the undersurfaces of opposite side portions of the bottom wall 62 and interconnected at their forward ends by means of a forward transverse member 70 secured therebetween and also to the undersurface of the bottom wall 62. In addition, the frame 64 further includes a rear transverse member 72 also secured between the members 66 and 68 and secured to the undersurface of the bottom wall 62.

The load bed assembly 56 is receivable between the side walls 46 and 48 and the rear end thereof is pivotally supported from the rear ends of the longitudinal members 14 and 16 by means of pivot connections 74 between the longitudinal member 14 and the bracing member 66 and the longitudinal member 16 and the bracing member 68. Further, the upper rear corners of the side walls or sides 60 include sleeve supporting brackets 76 by which aligned pivot sleeves 78 are supported from the side walls 60. The load bed assembly 56 includes a tailgate assembly generally referred to by the reference numeral 80 and including opposite side outwardly projecting pivot pins 82 secured through the pivot sleeves 78 by means of removable fasteners such as cotter pins or keys 84. Accordingly, it may be seen that the tailgate assembly 80 may pivot from the closed positions thereof illustrated in solid lines in FIGURES 1 and 2 of the drawings to the open positions illustrated in phantom lines in FIGURE 2 of the drawings and in solid lines in FIGURE 4 of the drawings.

The front wall 58 of the load bed assembly 56 and the bottom wall 62 include coacting portions defining a forwardly and downwardly opening upstanding recess 82. The transverse member 18 includes a pair of longitudinally spaced but centrally disposed mounting brackets 84 and the lower end portion of an elongated longitudinally extendible fluid motor generally referred to by the reference numeral 86 is pivotally secured between the mounting brackets 84 by means of a suitable pivot fastener 88. The hydraulic cylinder 86 is of multi-section type and includes a free extendible end porton 90 which is pivotally secured between a pair of laterally spaced mounting blocks 92 secured in the upper end of the recess 82. The upper extendible end 90 of the fluid motor 86 is secured between the mounting blocks 92 by means of a suitable pivot fastener 94.

The tongue portion 26 includes any suitable support means (not shown) extending between the forward ends of the forwardly convergent members 22 and 24 and from which an electric motor driven hydraulic pump assembly referred to in general by the reference numeral 96 is supported. The pump assembly 96 may be of any suitable type provided with a self-contained hydraulic fluid reservoir and includes a pressurized hydraulic fluid outlet 98. A high pressure hydraulic line 100 of any suitable type communicates the outlet 98 with the interior of the hydraulic cylinder 86 and the assembly 96 is electrically connected to a storage battery referred to in general by the reference numeral 102 also supported from the tongue portion 26. Of course, suitable control means in the form of electrical switches may be interposed between the storage battery 102 and the electric motor driven pump assembly 96. In addition, the forward end of the tongue portion 26 may be provided with a conventional retractable and extendible prop assembly generally referred to by the reference numeral 106.

It is believed that operation of the trailer 10 will be apparent from the foregoing description in that the load bed assembly 56 may be loaded with any suitable material or load and trailed to any desired location. After once being trailed to the desired location, the trailer 10 may be uncoupled from the towing vehicle and the prop assembly 106 may be swung to the operative position so as to support the trailer 10 in the manner illustrated in FIGURE 2 of the drawings. Of course, if it is not desired to uncouple the trailer 10, the prop assembly 106 may be retained in the retracted position and the aforementioned suitable controls (not shown) may be actuated in order to effect operation of the electric motor driven pump assembly 96 and thereby extend the hydraulic cylinder 86 so as to pivot the load bed assembly 56 from the load carrying position thereof illustrated in solid lines in FIGURE 2 of the drawings to the load dumping position thereof illustrated in phantom lines in FIGURE 2 of the drawings. Of course, the tailgate assembly 80 is provided with a latching mechanism referred to in general by the reference numeral 110 which may be utilized to releasably retain the tailgate assembly 80 in the closed position illustrated in solid lines in FIGURE 1 of the drawings.

Inasmuch as the motor driven hydraulic pump 86 is powered by a conventional storage battery 102, should the battery 102 become discharged, it is only necessary to electrically connect the conventional storage battery of the vehicle towing the trailer 10 to the electric motor driven pump assembly 96 in any convenient manner such as by jumper cables or the like.

What is claimed as new is as follows:

1. A load carrying and dumping vehicle including a wheeled frame having front and rear end portions, a pair of upstanding longitudinally extending opposite side wall means supported from said rear end portion, a dump-type load bed supported from said frame between said side wall means and including upstanding front and opposite side walls interconnected adjacent their lower ends by means of a bottom wall, the rear end of said load bed being pivotally supported from said frame for swinging movement relative thereto about a horizontal axis extending transversely of said frame between a first horizontal load carrying position and a second forwardly and upwardly inclined rearward dumping position, means operatively connected between the forward end portion of said load bed and said frame operable to swing said load bed from said first position toward said second position, said means connected between said load bed and said frame including an extendible fluid motor, said fluid motor being elongated and longitudinally extendible, said motor, when said load bed is in said first position, being generally vertically disposed and connected at its upper end to an upper portion of said front wall centrally intermediate its opposite sides, said means connected between said load bed and said frame including an extendible fluid motor, said vehicle including an electric motor driven fluid pump having a reservoir of hydraulic fluid operatively associated therewith, said pump including a fluid outlet operatively connected to said fluid motor for extending the same in response to discharge of fluid under pressure from said fluid outlet, said vehicle including a battery electrically connected with said electric motor, said vehicle comprising a trailer including a forwardly projecting tongue portion, said motor driven pump, reservoir and battery being supported from said tongue portion.

2. The combination of claim 1 wherein said front wall and said bottom wall include coacting portions defining an upstanding forwardly and downwardly opening recess in which said fluid motor is disposed.

3. The combination of claim 1 wherein said load bed includes an end gate extending between the rear ends of said side walls and movable between a first position closing the rear end of said load bed and a second position with the rear end of said load bed at least partially closing the rear of said load bed.

References Cited

UNITED STATES PATENTS

| 1,925,296 | 9/1933 | Barrett | 298—22 |
| 2,358,224 | 9/1944 | Golay | 298—1 X |
| 2,806,710 | 9/1957 | Mascaro | 298—5 X |
| 3,058,779 | 10/1962 | Pietroroia | 298—22 X |
| 3,065,993 | 11/1962 | Schramm | 298—5 |
| 3,235,284 | 2/1966 | Yant | 298—22 X |

FOREIGN PATENTS 490,788  2/1953  Canada.

RICHARD J. JOHNSON, *Primary Examiner.*

U.S. Cl. X.R.

298—5